United States Patent
Kawamoto (10) Patent No.: US 9,741,493 B2
(45) Date of Patent: Aug. 22, 2017

(54) LAMINATED SEMICONDUCTOR CERAMIC CAPACITOR WITH VARISTOR FUNCTION AND METHOD FOR MANUFACTURING THE SAME

(71) Applicant: Murata Manufacturing Co., Ltd., Nagaokakyo-shi, Kyoto-fu (JP)

(72) Inventor: Mitsutoshi Kawamoto, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 1 day.

(21) Appl. No.: 15/091,941

(22) Filed: Apr. 6, 2016

(65) Prior Publication Data
US 2016/0225527 A1    Aug. 4, 2016

Related U.S. Application Data (63) Continuation of application No. PCT/JP2014/077584, filed on Oct. 16, 2014.

(30) Foreign Application Priority Data

Nov. 18, 2013  (JP) ................................ 2013-237999

(51) Int. Cl.
*C04B 35/47* (2006.01)
*H01G 4/12* (2006.01)
(Continued)

(52) U.S. Cl.
CPC .......... *H01G 4/1281* (2013.01); *H01B 3/12* (2013.01); *H01C 7/10* (2013.01); *H01G 4/0085* (2013.01);
(Continued)

(58) Field of Classification Search
CPC ................................ C04B 35/47; C04B 35/465
See application file for complete search history.

(56) References Cited

U.S. PATENT DOCUMENTS 7,572,406 B2 *  8/2009  Kawamura ............ B82Y 30/00
                                                 264/615
7,583,493 B2    9/2009  Tani et al.
(Continued)

FOREIGN PATENT DOCUMENTS

| JM | 2013131596 A | 7/2013 |
| JP | H0521266 A | 1/1993 |

(Continued)

OTHER PUBLICATIONS

International Search Report issued for PCT/JP2014/077584, date of mailing Jan. 27, 2015.
(Continued)

*Primary Examiner* — Noah Wiese
(74) *Attorney, Agent, or Firm* — Arent Fox LLP (57) ABSTRACT

A component body is obtained by alternately laminating and sintering a plurality of semiconductor ceramic layers formed of a $SrTiO_3$-based grain boundary insulated semiconductor ceramic and a plurality of internal electrode layers. The average grain diameter of crystal grains is 1.0 ∝m or less and a coefficient of variation representing variations in a grain diameter of the crystal grains is 30% or less. To prepare the semiconductor ceramic an Sr compound, a Ti compound and a donor compound are weighed in predetermined amounts and mixed/pulverized. A calcined powder is prepared and a dispersant is added with an acceptor compound to the calcined powder. The resulting mixture is wet-mixed and a heat-treated powder is prepared. The heat-treated powder is formed into slurry and subjected to a filter treatment. The filtered slurry is used to prepare a semiconductor ceramic. The resulting laminated semiconductor ceramic capacitor (Continued)

has a varistor function having excellent durability, which can suppress a reduction of insulating properties and ensure desired electrical characteristics even when ESD occurs repeatedly.

15 Claims, 4 Drawing Sheets

(51) Int. Cl.
    *H01G 4/30*     (2006.01)
    *H01B 3/12*     (2006.01)
    *H01C 7/10*     (2006.01)
    *H01G 4/008*     (2006.01)
    *H01G 4/248*     (2006.01)
    *H01G 4/35*     (2006.01)

(52) U.S. Cl.
    CPC .............. *H01G 4/12* (2013.01); *H01G 4/1218* (2013.01); *H01G 4/248* (2013.01); *H01G 4/30* (2013.01); *H01G 4/35* (2013.01)

(56) References Cited

U.S. PATENT DOCUMENTS

| 8,040,658 | B2* | 10/2011 | Kawamoto | C01G 23/006 |
|---|---|---|---|---|
| | | | | 361/306.1 |
| 9,343,522 | B2 | 5/2016 | Kawamoto et al. | |
| 2004/0067659 | A1* | 4/2004 | Black | H01L 21/316 |
| | | | | 438/778 |
| 2004/0188002 | A1 | 9/2004 | Kawamura et al. | |
| 2007/0104640 | A1 | 5/2007 | Kawamura et al. | |
| 2007/0104970 | A1 | 5/2007 | Kawamura et al. | |
| 2010/0103587 | A1 | 4/2010 | Kawamoto | |
| 2013/0177739 | A1 | 7/2013 | Syoujiguchi | |
| 2014/0091432 | A1 | 4/2014 | Kawamoto et al. | |
| 2014/0160626 | A1 | 6/2014 | Shiota et al. | |

FOREIGN PATENT DOCUMENTS

| JP | 2007173714 A | 7/2007 |
|---|---|---|
| JP | 2004284897 A | 10/2016 |
| WO | WO 2008004389 A1 | 1/2008 |
| WO | WO 2009001690 A1 | 12/2008 |
| WO | WO 2012017967 A1 | 2/2012 |
| WO | WO 2012176714 A1 | 12/2012 |
| WO | WO 2013039045 A1 | 3/2013 |

OTHER PUBLICATIONS

Written Opinion of the International Searching Authority issued for PCT/JP2014/076756, date of mailing 01 Jan. 27, 2015.

* cited by examiner

LAMINATED SEMICONDUCTOR CERAMIC CAPACITOR WITH VARISTOR FUNCTION AND METHOD FOR MANUFACTURING THE SAME

CROSS REFERENCE

The present application is a continuation of International application No. PCT/JP2014/077584, filed Oct. 16, 2014, which claims priority to Japanese Patent Application No. 2013-237999, filed Nov. 18, 2013, the entire contents of each of which are incorporated herein by reference.

TECHNICAL FIELD

The present invention relates to a laminated semiconductor ceramic capacitor with a varistor function and a method for manufacturing the same, and more particularly relates to a laminated semiconductor ceramic capacitor with a varistor function where a $SrTiO_3$-based grain boundary insulated semiconductor ceramic is used for the varistor function, and a method for manufacturing the same.

BACKGROUND ART

In recent years, with the development of electronics technology, mobile electronic devices such as cellular phones and laptop personal computers, and in-car electronic devices to be installed on cars have been becoming common, and the reduction in size with multi-functionalization has been required for the electronic devices.

On the other hand, in order to achieve the reduction in size with multi-functionalization for the electronic devices, more semiconductor elements have been used such as various types of ICs and LSI, and accordingly, the electronic devices have been decreasing their noise immunity.

Therefore, power lines for semiconductor elements are provided with a film capacitor, a laminated ceramic capacitor, a laminated semiconductor ceramic capacitor, or the like as a bypass capacitor, to ensure the noise immunity to the electronic devices.

In particular, in the case of car navigation systems, car audio systems, in-car ECUs, etc., what is commonly the case is that a capacitor with a capacitance on the order of 1 nF is connected to an external terminal, thereby to absorb high-frequency noises.

However, while these capacitors deliver superior performance on the absorption of high-frequency noises, the capacitors themselves have no function of absorbing high-voltage pulses or static electricity. For this reason, if the high-voltage pulses or static electricity are input to the electronic devices, there is a possibility that the high-voltage pulses or static electricity may cause the electronic device to malfunction or cause the semiconductor elements to be broken. In particular, when the capacitor has a low capacitance on the order of 1 nF, since an ESD (electro-static discharge) withstand voltage is extremely low (for example, about 2 to 4 kV), there is a possibility that this may cause the capacitor to brake.

Figure 4:
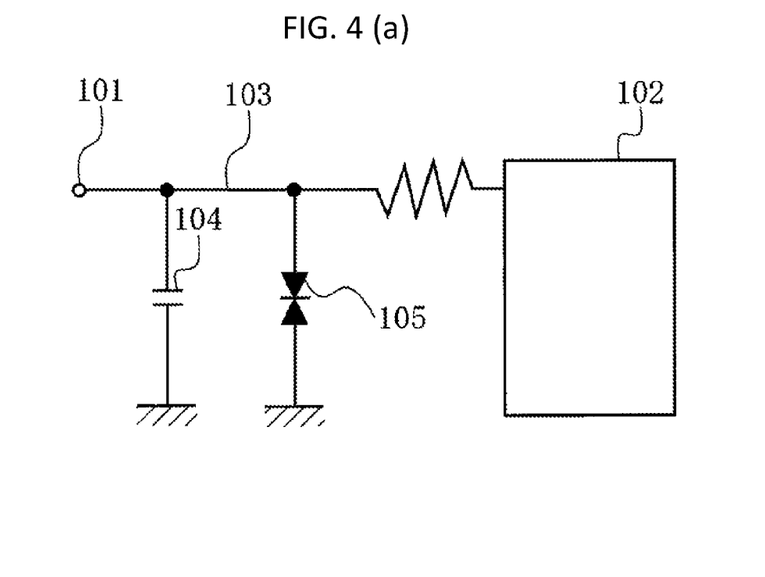

Thus, conventionally, as shown in FIG. 4(*a*), ESD countermeasure is taken by connecting a zener diode 105 in parallel with a capacitor 104 connected to a power source line 103 connecting between an external terminal 101 and a semiconductor element 102 such as an IC, or connecting a varistor 106 in parallel with the capacitor 104, as shown in FIG. 4(*b*).

However, when the zener diode 105 or the varistor 106 is connected in parallel with the capacitor 104 as described above, the number of components is increased to cause an increase in cost, and moreover, the space for the placement of the components has to be secured, and there is thus a possibility that an increase in the size of the device is caused.

On the other hand, a $SrTiO_3$-based grain boundary insulated laminated semiconductor ceramic capacitor is known to have a varistor characteristic, and receives attention as a countermeasure item for ESD since an application of a voltage of a certain level or more allows a large current to flow.

Figure 5:
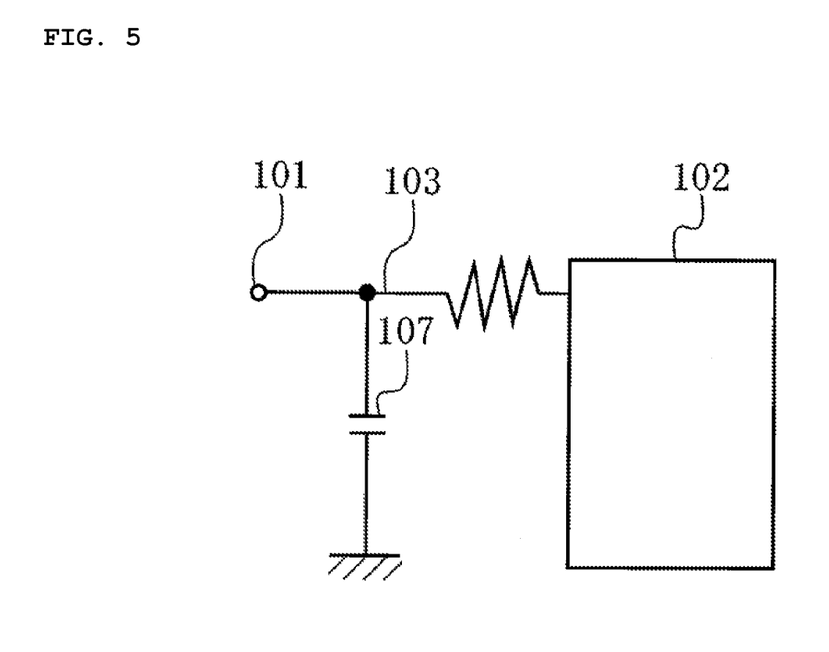
FIG. 5 is an electric circuit diagram in the case where a laminated semiconductor ceramic capacitor in which a capacitor has a varistor function is connected to the power source line.

Accordingly, if this type of the laminated semiconductor ceramic capacitor can have immunity to ESD and protect the semiconductor element 102, only a single laminated semiconductor ceramic capacitor 107 can cover both functions as shown in FIG. 5 thereby avoiding, or at least reducing, the need to provide a zener diode 105 or a varistor 106. As a result, the number of components and/or cost are reduced, standardization of design is facilitated, and a capacitor having added values can be provided.

WO 2012/176714 A proposes a ceramic powder which is used for SrTiO3-based grain boundary insulated semiconductor ceramic and in which a specific surface area is 4.0 $m^2/g$ or more and 8.0 $m^2/g$ or less and a 90% cumulative diameter D90 is 1.2 µm or less.

In WO 2012/176714 A, a heat-treated powder whose specific surface area is 4.0 m2/g or more and 8.0 m2/g or less and 90% cumulative diameter D90 is 1.2 µm or less is prepared by weighing a Sr compound, a Ti compound and a donor compound in predetermined amounts, mixing/pulverizing these compounds and calcining the resulting powder to prepare a calcined powder, and adding a dispersant with an acceptor compound to the calcined powder, dispersing the resulting mixture of calcined powder while wet-mixing for a predetermined time, and then heat-treating the mixture.

Then, the fired crystal grains coarsening is suppressed by using the heat-treated powder, thereby attempting to attain a semiconductor ceramic capacitor having good ESD withstand voltage.

SUMMARY OF THE INVENTION

It has become evident from the present inventor's investigation that in the heat-treated powder of WO 2012/176714 A, a repeated occurrence of ESD causes insulation properties to deteriorate and makes it difficult to ensure a desired level of durability even though initial insulating properties are good. The reason for this is believed to be as follows.

In WO 2012/176714 A, a heat-treated powder in which a specific surface area is 4.0 $m^2/g$ or more and 8.0 $m^2/g$ or less and a 90% cumulative diameter D90 is 1.2 µm or less, semiconductor ceramic being a sintered body is prepared.

A dispersant is added to the heat-treated powder when mixing the calcined powder and the acceptor compound to suppress agglomeration of crystal grains, the crystal grains are agglomerated during the process of preparing the ceramic slurry, resulting in coarsening of the crystal grains, and therefore variations in a grain diameter of the crystal grains increase. When the semiconductor ceramic is prepared using such a heat-treated powder having large variations in a grain diameter, coarsening crystal grains are locally present in the semiconductor ceramic, and therefore it is believed that ESD occurring repeatedly causes a remarkable deterioration to the insulation resistance resulting in the deterioration of durability to ESD (ESD immunity).

This is highly problematic because increased durability and reliability of the semiconductor ceramic capacitor are required with improvement in performance of the mobile electronic devices or in-car electronic devices. Therefore, it is desirable to ensure ESD immunity even in extremely severe conditions, and a laminated semiconductor ceramic capacitor with a varistor function having good durability which can ensure resistance, for example, even when ESD occurs repeatedly about 1000 times, is highly advantageous.

The present invention was made in view of the foregoing situation, and it is an object of the present invention to provide a laminated semiconductor ceramic capacitor with a varistor function having excellent durability, which can suppress a reduction of insulating properties and ensure desired electrical characteristics even when ESD occurs repeatedly, and a method for manufacturing the laminated semiconductor ceramic capacitor with a varistor function.

In order to achieve the above-mentioned object, the present inventor has made earnest investigations concerning the SrTiO3-based grain boundary insulated laminated semiconductor ceramic capacitor, and has determined that by using a semiconductor ceramic in which an average grain diameter $D_{ave}$ of crystal grains is 1.0 μm or less, and a coefficient of variation CV representing variations in a grain diameter of the crystal grains is 30% or less, a laminated semiconductor ceramic capacitor having excellent durability, which can suppress a reduction of insulating properties and ensure desired electrical characteristics even when ESD occurs repeatedly, can be obtained.

The present invention was made based on these findings, and the laminated semiconductor ceramic capacitor with a varistor function (hereinafter, referred to just as a "laminated semiconductor ceramic capacitor") according to the present invention comprises a sintered ceramic body having a plurality of alternately stacked semiconductor ceramic layers and internal electrode layers, the semiconductor ceramic layers comprising $SrTiO_3$, each semiconductor ceramic layer having crystal grains with an average grain diameter $D_{ave}$ equal to or less than 1.0 μm and a coefficient of variation CV of the grain diameter of the crystal grains of the semiconductor ceramic layer which is 30% or less, wherein CV is a ratio of a standard deviation σ to the average grain diameter $D_{ave}$ expressed as a percentage; and external electrodes on opposite surfaces of the sintered ceramic body and electrically connect to the internal electrodes.

When the average grain diameter $D_{ave}$ and the coefficient of variation CV of the crystal grains in the semiconductor ceramic are specified as described above, the semiconductor ceramic layer can avoid the local presence of coarsening crystal grains, the crystal grains are fine particles and the uniformity of a grain size distribution is improved. As a result, it is possible to obtain a laminated semiconductor ceramic capacitor having excellent durability, which can suppress a reduction of insulating properties and has desired electrical characteristics even when ESD occurs repeatedly.

Further, in the laminated semiconductor ceramic capacitor of the present invention, the semiconductor ceramic preferably has a compounding molar ratio m of a Sr site to a Ti site, which satisfies the relational expression 0.990≤m≤1.010, has a donor element solid-solved in crystal grains, and has an acceptor element present in a grain boundary layer in the range of 0.7 mol or less (however, not including 0 mol) with respect to 100 mol of the Ti element.

Further, in the laminated semiconductor ceramic capacitor of the present invention, the acceptor element is preferably at least one of Mn, Co, Ni, and Cr.

Further, in the laminated semiconductor ceramic capacitor of the present invention, the donor element is preferably at least one element selected from among La, Nd, Sm, Dy, Nb, and Ta.

Further, in the laminated semiconductor ceramic capacitor of the present invention, a low melting point oxide is preferably contained in an amount of 0.1 mol or less with respect to 100 mol of the Ti element.

Moreover, in the laminated semiconductor ceramic capacitor of the present invention, the low melting point oxide is preferably $SiO_2$.

Further, in the laminated semiconductor ceramic capacitor of the present invention, the internal electrode is preferably predominantly composed of Ni.

Further, the laminated semiconductor ceramic capacitor can be prepared by mixing a calcinated powder containing an Sr compound, a Ti compound and a donor compound with at least an acceptor compound and a dispersant and heat-treating the resulting mixture to prepare a heat-treated powder; forming the heat-treated powder into slurry to prepare a ceramic slurry; subjecting the ceramic slurry to a filter treatment; forming a ceramic green sheet using the filtered ceramic slurry and then alternately laminating layers of conductive film and the ceramic green sheet to form a laminate; subjecting the laminate to a firing treatment comprising a primary firing treatment in a reducing atmosphere followed by a secondary firing treatment in an atmosphere of air or an oxidizing atmosphere; wherein the foregoing acts are carried out in such a manner that an average grain diameter $D_{ave}$ of the semiconductor ceramic is 1.0 μm or less after the firing treatment and such that a coefficient of variation CV of crystal grains of the semiconductor ceramic is 30% or less, the CV ratio being a ratio of a standard deviation σ to the average grain diameter $D_{ave}$ of the semiconductor ceramic expressed as a percentage.

Further, in the method for manufacturing a laminated semiconductor ceramic capacitor of the present invention, the filtering step is preferably performed by passing the ceramic slurry through a filter with a bore of 30 μm or less on the circle equivalent basis.

Thereby, the coarse grains produced due to the agglomeration in the ceramic slurry or the like can be effectively removed.

Further, in the method for manufacturing a laminated semiconductor ceramic capacitor of the present invention, the filter preferably has a bore of 5 μm or more on the circle equivalent basis.

This can suppress the occurrence of plugging of the filter, and a desired laminated semiconductor ceramic capacitor can be obtained while avoiding a reduction of operating efficiency to the utmost.

Further, in the method for manufacturing a laminated semiconductor ceramic capacitor of the present invention, the filtering is preferably performed multiple times.

This can more effectively suppress the occurrence of the variations in a grain diameter of the crystal grains.

Further, in the method for manufacturing a laminated semiconductor ceramic capacitor of the present invention, the content of the dispersant is preferably 1 to 3 parts by weight with respect to 100 parts by weight of the calcined powder.

Thereby, the ceramic slurry can be subjected to a filter treatment in a desired dispersion state.

Further, in the method for manufacturing a laminated semiconductor ceramic capacitor of the present invention, a firing temperature in the primary firing treatment is preferably lower than a calcining temperature in the calcination treatment.

Thereby, grain growth of crystal grain is hardly promoted in the primary firing treatment to suppress the coarsening of crystal grain, and therefore it becomes possible to control a grain diameter of the crystal grain by the calcining temperature in preparing the calcined powder.

In accordance with an embodiment of the laminated semiconductor ceramic capacitor, in a laminated semiconductor ceramic capacitor with a varistor function comprising a laminated sintered body obtained by alternately laminating and sintering a plurality of semiconductor ceramic layers formed of a $SrTiO_3$-based grain boundary insulated semiconductor ceramic and a plurality of internal electrode layers, and external electrodes on both ends of the laminated sintered body, the external electrodes electrically connected to the internal electrode layers, since an average grain diameter $D_{ave}$ of crystal grains of the semiconductor ceramic is 1.0 μm or less and a coefficient of variation CV representing variations in a grain diameter of the crystal grains is 30% or less, the semiconductor ceramic layer can avoid the local presence of coarsening grains, and crystal grains are fine particles and the uniformity of a grain size distribution is improved. Thereby, it is possible to obtain a laminated semiconductor ceramic capacitor having excellent durability, which can suppress a reduction of insulating properties and has desired electrical characteristics even when ESD occurs repeatedly.

As a result, since it becomes possible to realize functions of a capacitor and a zener diode by one laminated semiconductor ceramic capacitor, the number of components or cost can be reduced, and standardization of design is facilitated, and therefore a laminated semiconductor ceramic capacitor having good ESD immunity, excellent reliability and an added value can be provided.

Further, according to a method for manufacturing a laminated semiconductor ceramic capacitor in accordance with the present invention, since it comprises a calcined powder preparation step of weighing a Sr compound, a Ti compound and a donor compound in predetermined amounts, mixing/pulverizing these compounds, and then calcining the resulting powder so as to have an average grain diameter $D_{ave}$ of 1.0 μm or less after firing to prepare a calcined powder; a heat-treated powder preparation step of adding at least an acceptor compound and a dispersant to the calcined powder, and mixing and heat-treating the resulting mixture to prepare a heat-treated powder; a slurry preparation step of forming the heat-treated powder into slurry to prepare a ceramic slurry; a filtering step of subjecting the ceramic slurry to a filter treatment so that a coefficient of variation CV representing variations in a grain diameter of the crystal grains after firing is 30% or less; a laminate forming step of subjecting the ceramic slurry subjected to a filter treatment to a forming process to prepare a ceramic green sheet, and then laminating alternately a conductive film and the ceramic green sheet to form a laminate; and a firing step of subjecting the laminate to a primary firing treatment in a reducing atmosphere, and then subjecting the laminate to a secondary firing treatment in a weakly reducing atmosphere, an atmosphere of the air or an oxidizing atmosphere, it is possible to remove grains having coarsened due to the agglomeration of crystal grains by the filter treatment and therefore semiconductor ceramic in which grains are fine particles and variations in a grain diameter are suppressed are obtained. Thereby, it is possible to obtain a laminated semiconductor ceramic capacitor excellent in durability and reliability, which has such desired electrical characteristics that a reduction of insulating properties is suppressed even when ESD occurs repeatedly.

BRIEF EXPLANATION OF DRAWINGS

FIGS. 4(a) and (b) are electric circuit diagrams in the case where a zener diode or a varistor, respectively, is connected in parallel with a bypass capacitor disposed to a power source line.

MODE FOR CARRYING OUT THE INVENTION

Next, an embodiment of the present invention will be described in detail.

Figure 1:
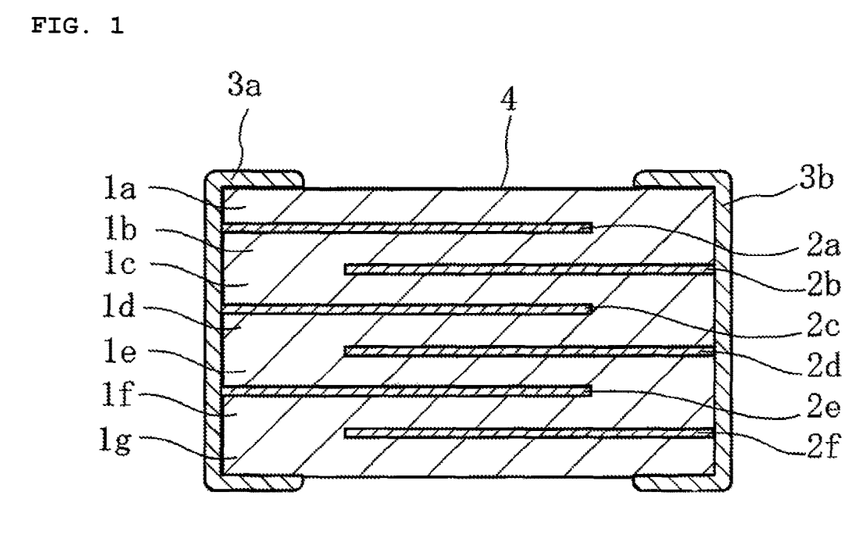
FIG. 1 is a cross-sectional view schematically showing an embodiment of a laminated semiconductor ceramic capacitor according to the present invention.

FIG. 1 is a cross-sectional view schematically showing an embodiment of a laminated semiconductor ceramic capacitor according to the present invention.

The laminated semiconductor ceramic capacitor includes a component body (laminated sintered body) 4 and external electrodes 3a and 3b formed on opposite ends of the component body 4.

The component body 4 includes a laminated sintered body obtained by alternately laminating and sintering a plurality of semiconductor ceramic layers 1a to 1g preferably formed of a $SrTiO_3$-based grain boundary insulated semiconductor ceramic and a plurality of internal electrode layers 2a to 2f, and internal electrode layers 2a, 2c and 2e are exposed to one end face of the component body 4 and electrically connected to one external electrode 3a, and internal electrode layers 2b, 2d and 2f are exposed to the other end face of the component body 4 and electrically connected to the other external electrode 3b.

In the semiconductor ceramic layers 1a to 1g, a principal component is preferably composed of a $SrTiO_3$-based material, a donor element is solid-solved in crystal grains, and an acceptor element is present in a grain boundary layer. That is, the semiconductor ceramic layers 1a to 1g are microscopically composed of a plurality of crystal grains made of semiconductor ceramic and grain boundary layers formed around the crystal grain (not shown), and the crystal grains form a capacitance together with the grain boundary layer interposed therebetween. These capacitances are linked to one another in series or in parallel between opposed planes of internal electrode layers 2a, 2c, 2e and internal electrode layers 2b, 2d, 2f, and thereby desired capacitance is attained as a whole.

In addition, an internal electrode material to be used for the internal electrode layers 2a to 2f is not particularly limited, an inexpensive metal material predominantly composed of Ni, which is low in cost and has good conductivity, is usually preferably used.

Further, an external electrode material to be used for the external electrodes 3a and 3b is also not particularly limited, and Ni, Cr, Cu, Ga, In or alloys containing them can be used. The external electrodes 3a and 3b can be formed into a monolayer structure or a multilayer structure using these external electrode materials, and an Ag layer is preferably formed on the outer surface of each of these external electrode materials, and moreover a plating film including Ni, Sn or the like may be formed using each of these external electrode materials as an underlying electrode to form the external electrodes 3a and 3b.

In the laminated semiconductor ceramic capacitor, the semiconductor ceramic constituting the semiconductor ceramic layers 1a to 1g is formed so that an average grain diameter $D_{ave}$ of crystal grains is 1.0 μm or less and a coefficient of variation CV representing variations in a grain diameter of the crystal grains is 30% or less.

When the average grain diameter $D_{ave}$ and variations in a grain diameter of the crystal grains constituting the semiconductor ceramic are specified as described above, coarsening crystal grains are not locally present in the semiconductor ceramic layer, the crystal grains are fine particles and variations of a grain size distribution is suppressed, and therefore it is possible to obtain a laminated semiconductor ceramic capacitor having good durability, which can ensure desired ESD withstand voltage even when ESD occurs repeatedly.

Hereinafter, the reason why the average grain diameter $D_{ave}$ of the crystal grains and the coefficient of variation CV of the crystal grains are specified as described above, will be described.

(1) Average Grain Diameter $D_{ave}$ of Crystal Grain

Variations in a grain diameter of the crystal grains can be evaluated based on the coefficient of variation CV as described later; however, when the average grain diameter $D_{ave}$ of the crystal grains exceeds 1.0 μm, the particle size distribution of the crystal grain is excessively widened and it is difficult to keep the coefficient of variation CV 30% or less. As a result, since the variations in a grain diameter increase, ESD occurring repeatedly it causes insulation properties to deteriorate and makes it difficult to ensure desired durability even though initial insulating properties are good.

Thus, in the present embodiment, the semiconductor ceramic is preferably formed so that the average grain diameter $D_{ave}$ of crystal grains is 1.0 μm or less.

(2) Coefficient of Variation CV of Crystal Grain

Variations in a grain diameter of the crystal grains can be evaluated based on the coefficient of variation CV which is a ratio of a standard deviation σ to an average grain diameter $D_{ave}$ expressed in percentage, as shown in a mathematical formula:

$$CV = (\sigma/D_{ave}) \times 100 \quad \text{Formula (1)}$$

When the coefficient of variation CV exceeds 30%, the crystal grains will have coarsened due to agglomeration and are localized in the semiconductor ceramic even though an average of primary particle diameters of the crystal grains is 1.0 μm or less. As a result, when ESD occurs repeatedly the insulation properties deteriorate and make it difficult to ensure desired durability even though initial insulating properties are good.

Thus, in the present embodiment, the coefficient of variation CV is set to 30% or less.

As described above, in the above-mentioned laminated semiconductor ceramic capacitor, since an average grain diameter $D_{ave}$ of crystal grains of the semiconductor ceramic constituting the semiconductor ceramic layers 1a to 1g is 1.0 μm or less and a coefficient of variation CV representing variations in a grain diameter of the crystal grains is 30% or less, it is possible to avoid or at least minimize the local presence of coarsening crystal grains in the semiconductor ceramic layers 1a to 1g, and crystal grains are fine particles and the uniformity of a grain size distribution is improved. Thereby, it is possible to obtain a laminated semiconductor ceramic capacitor having excellent durability, which can suppress a reduction of insulating properties and has desired electrical characteristics even when ESD occurs repeatedly.

As a result, since it becomes possible to realize functions of a capacitor and a zener diode using one laminated semiconductor ceramic capacitor, the number of components and/or cost can be reduced, and standardization of design is facilitated, and therefore a laminated semiconductor ceramic capacitor having good ESD immunity, excellent reliability and an added value can be provided.

In addition, in the present embodiment, the compounding molar ratio m of a Sr site to a Ti site is not particularly limited; however, it is preferred to make adjustment so as to satisfy a relational expression $0.990 \leq m \leq 1.010$.

That is, by containing Sr in excess of stoichiometric composition, Sr, which is deposited in the crystal grain boundary without being solid-solved in the crystal grains, suppresses the grain growth, and therefore fine crystal grains are obtained. Since the crystal grain becomes fine, oxygen easily goes round in a crystal grain boundary, and therefore the formation of a Schottky barrier is promoted to contribute to securement of good insulating properties.

However, when the compounding molar ratio m is more than 1.010, since the precipitation of Sr not solid-solved in the crystal grain on the crystal grain boundary is increased to excessively increase the thickness of the grain boundary insulating layer, there is a possibility that a reduction in the capacitance is caused.

On the other hand, when the compounding molar ratio m is less than 0.990, the molar content of Ti is excessive, the crystal grain tends to coarsen, and there is a possibility that insulating property is reduced.

Accordingly, while the compounding molar ratio m is not particularly limited, it is preferably adjusted so as to be $0.990 \leq m \leq 1.010$.

In addition, the donor element is allowed to be solid-solved in the crystal grains in order to bring the ceramic into a semiconductor by the firing treatment in a reducing atmosphere described above, and the content of the donor element is not particularly limited. However, when the content of the donor element is less than 0.2 mol with respect to 100 mol of the Ti element, there is a possibility that the capacitance is decreased excessively. On the other hand, when the content of the donor element is greater than 1.2 mol with respect to 100 mol of the Ti element, there is a possibility that an allowable temperature range for the firing temperature is narrowed.

Therefore, in the present embodiment the molar content of the donor element may be 0.2 to 1.2 mol, and preferably 0.4 to 1.0 mol with respect to 100 mol of the Ti element.

Such the donor element is not particularly limited, and for example, La, Nd, Sm, Dy, Nb, and Ta can be used.

Further, the acceptor element is present in the grain boundary insulating layer as described above. The grain boundary insulating layer forms an energy level (grain boundary level) which is electrically activated to promote the formation of a Schottky barrier, and therefore insulation resistance can be improved and a laminated semiconductor ceramic capacitor having good insulating properties can be attained. However, when the molar content of the acceptor element is more than 0.7 mol with respect to 100 mol of the Ti element, it is not preferred since a reduction in an ESD withstand voltage is caused.

Therefore, the molar content of the acceptor element is 0.7 mol or less (however, not including 0 mol), and preferably 0.3 to 0.5 mol with respect to 100 mol of the Ti element.

Further, while this acceptor element is not particularly limited, Mn, Co, Ni, Cr, etc. can be used, and in particular, Mn is preferably used.

It is also preferable to add a low melting point oxide to the semiconductor ceramic layers $1a$ to $1g$ in an amount of 0.1 mol or less with respect to 100 mol of the Ti element, and the addition of this type of a low melting point oxide can improve the sinterability, and promote the segregation of the acceptor element in the crystal grain boundary.

In addition, the molar content of the low melting point oxide was set to the range mentioned above because the molar content greater than 0.1 mol with respect to 100 mol of the Ti element may possibly lead to an excessive reduction in capacitance, thereby resulting in a failure to achieve desired electrical characteristics.

The low melting point oxide is not particularly limited, and $SiO_2$, glass-ceramic containing B or an alkali metal element (such as K, Li, and Na), copper-tungsten salts, etc. can be used, and among these, $SiO_2$ is preferably used.

Next, an embodiment will be described with reference to a method for manufacturing the laminated semiconductor ceramic capacitor.

First, as ceramic raw materials, a Sr compound such as $SrCO_3$, a donor compound containing a donor element such as La or Sm, and a Ti compound having a fine particle size, for example, $TiO_2$ having a specific surface area of 10 $m^2/g$ or more (average grain diameter: about 0.1 μm or less) are respectively prepared, and weighed in a predetermined amount.

Then, for example, 1 to 3 parts by weight of a dispersant is added to 100 parts by weight of these weighed materials, and then the resulting mixture is charged into a ball mill with a pulverizing medium such as PSZ (partially stabilized zirconia) balls and pure water, and adequately wet-mixed in the ball mill to prepare a slurry.

Next, this slurry is evaporated to dryness, and then subjected to a calcination treatment at a predetermined temperature (for example, 1350° C. to 1450° C.) for about 2 hours in an atmosphere of the air to prepare a calcined powder having a donor element solid-solved therein.

Then, a predetermined amount of an acceptor compound containing an acceptor element such as Mn or Co is weighed, and a predetermined amount of a low melting point oxide such as $SiO_2$ is weighed as required. Next, these acceptor compound and low melting point oxide are mixed with the calcined powder, and further a predetermined amount of a dispersant and pure water are added, and the resulting mixture is charged into a ball mill again with the pulverizing medium and adequately wet-mixed in the ball mill to obtain a mixture.

The dispersant is added in order to avoid coarsening of the crystal grains due to agglomeration of the crystal grains in the mixture. That is, when the dispersant is not added, since the crystal grains are agglomerated, resulting in coarsening of the crystal grains even though the mixture is subjected to a filter treatment described later, it is difficult to keep the average grain diameter $D_{ave}$ of the crystal grains after firing 1.0 μm or less, and since the variations in a grain diameter increases, it is difficult to keep the coefficient of variation CV 30% or less.

Thus, in the present embodiment, the dispersant is added to the calcined powder in addition to the acceptor compound, and the resulting mixture is adequately wet-mixed for a predetermined time (e.g., 48 to 64 hours) to obtain a mixture.

In addition, the content of the dispersant may be an amount at which the agglomeration of crystal grains in the mixture can be avoided, and for example, 1 to 3 parts by weight of the dispersant may be added to 100 parts by weight of the calcined powder.

Further, a type of the dispersant is not particularly limited, and an organic dispersant, such as ammonium polycarboxylate, can be usually preferably used.

Then, the resulting mixture is evaporated to dryness, and heat-treated at a predetermined temperature (for example, 500° C. to 700° C.) for about 5 hours in an atmosphere of the air to prepare a heat-treated powder.

To the heat-treated powder, an organic solvent such as toluene or alcohol, an organic binder, a plasticizer, a surfactant and the like are appropriately added, and the resulting mixture is adequately wet-mixed to obtain a ceramic slurry.

Next, the ceramic slurry is subjected to a filter treatment to remove coarse grains in the ceramic slurry. That is, since the dispersant has been added in preparing the mixture, the crystal grains in the heat-treated powder keeps a state of being dispersed without agglomerating, but in subsequently preparing the ceramic slurry, the crystal grains agglomerate to form coarsened grains, and therefore the variations in a grain diameter increase.

Thus, the ceramic slurry is passed through a filter to perform filtering, whereby the coarse grains produced due to the agglomeration are removed to suppress variations in a grain diameter so that the coefficient of variation CV is 30% or less.

Herein, a bore of the filter is not particularly limited as long as coarse grains can be excluded so that the coefficient of variation CV is 30% or less; however, the bore of the filter is preferably 30 μm or less on the circle equivalent basis in order to effectively eliminate agglomerated coarse grains.

However, when the bore of the filter is excessively small, since there is a possibility that plugging or the like results in a reduction of operating efficiency, the bore of the filter is preferably 5 μm or more, and more preferably 10 μm or more on the circle equivalent basis.

Further, it is also preferred to perform filtering repeatedly multiple times, and thereby, the coarse grains formed due to agglomeration or the like can be more effectively removed, and the variations in a grain diameter can be suppressed because of further reduction of the coefficient of variation CV.

Next, the ceramic slurry is subjected to a forming process by using a forming processing method such as a doctor blade method, a lip coater method, a die coater method or any other suitable method to prepare a ceramic green sheet.

Then, using a conductive paste for internal electrodes preferably predominantly composed of Ni or the like, transfer onto the ceramic green sheet is performed using, for example, a screen printing method, a gravure printing method, a vacuum deposition method, or a sputtering method, thereby forming a conductive film of a predetermined pattern on the surface of the ceramic green sheet.

Then, a plurality of ceramic green sheets having the conductive films formed thereon are laminated in a predetermined direction, and a ceramic green sheet to be used for exterior layers which do not have conductive films formed thereon is laminated, and then the laminated ceramic green sheets are pressure bonded together, and cut into a predetermined dimension to prepare a laminate.

Thereafter, the laminate is subjected to a debinder treatment at a temperature of 300 to 500° C. for about 2 hours in a nitrogen atmosphere. Subsequently, the laminate is subjected to primary firing at a temperature of 1200 to 1250° C. for about 2 hours to be converted to a semiconductor state in a firing furnace brought into a reducing atmosphere, in which a ratio between a H2 gas flow rate and a N2 gas flow rate is adjusted to a predetermined value (for example, H2/N2=0.025/100 to 1/100).

As described above, by setting a firing temperature (1200 to 1250° C.) in the primary firing treatment lower than a calcining temperature (1350 to 1450° C.) in the calcination treatment, grain growth of the crystal grain is hardly promoted in the primary firing treatment, and therefore the coarsening of the crystal grain is suppressed, and this and the compounding molar ratio m between Sr and Ti combine to make it possible to easily maintain the average grain diameter $D_{ave}$ of crystal grains 1.0 μm or less.

Then, after bringing the laminate into a semiconductor state, a secondary firing is carried out at a low temperature of 600 to 900° C. for about 1 hour in an atmosphere of the air to reoxidize the semiconductor ceramic, thereby diffusing oxygen into the crystal grain. Thereby, the crystal grain boundary is insulated to become a grain boundary insulating layer, a Schottky barrier is formed in the crystal grain boundary to enable an improvement of insulation resistance, and therefore a component body 4 is prepared, the component body 4 including laminated sintered bodies having an internal electrode 2 buried therein.

Thereafter, a conductive paste for external electrodes is applied to opposite ends of the component body 4, and subjected to a firing treatment to form external electrodes 3*a* and 3*b*, thereby manufacturing a laminated semiconductor ceramic capacitor.

As described above, in the present embodiment, since the firing temperature (1200 to 1250° C.) in the primary firing treatment is set lower than the calcining temperature (1350 to 1450° C.) in the calcination treatment, the coarsening of the crystal grain in the primary firing treatment can be minimized, and therefore this and the compounding molar ratio m between Sr and Ti combine to enable to keep the average grain diameter $D_{ave}$ of crystal grains 1.0 μm or less.

Moreover, since a Sr compound, a Ti compound and a donor compound are weighed in predetermined amounts, mixed/pulverized, and calcined to prepare a calcined powder, thereafter an acceptor compound is added and the resulting mixture is heat-treated to prepare a heat-treated powder, a solvent containing a dispersant is added to the heat-treated powder and the resulting mixture is formed into slurry, the ceramic slurry is subjected to the filter treatment to remove coarse grains agglomerated and the ceramic slurry from which these coarse grains are removed is used, the coefficient of variation CV of the crystal grains in the semiconductor ceramic can be reduced to 30% or less, whereby the variations in a grain diameter can be suppressed.

When a laminated semiconductor ceramic capacitor is prepared by using a semiconductor ceramic in which an average grain diameter $D_{ave}$ of crystal grains is 1.0 μm or less and a coefficient of variation CV representing variations in a grain diameter of the crystal grains is 30% or less, a laminated semiconductor ceramic capacitor having excellent durability, without a degradation of its insulating properties and has desired electrical characteristics even when ESD occurs repeatedly, can be obtained. As a result, since it becomes possible to realize functions of a capacitor and a zener diode by one laminated semiconductor ceramic capacitor, the number of components and/or cost can be reduced, the standardization of design is facilitated and therefore a laminated semiconductor ceramic capacitor having excellent reliability and an added value can be provided.

In addition, the present invention is not limited to the embodiment described above. For example, the solid solution is prepared by a solid phase method in the above embodiment; however, the method for preparing the solid solution is not particularly limited, and any methods can be employed, such as a hydrothermal synthesis method, a sol-gel method, a hydrolysis method, and a coprecipitation method.

Next, examples of the present invention will be described specifically.

EXAMPLES

[Preparation of Samples]

As ceramic raw materials, SrCO3, TiO2 having a specific surface area of 30 m$^2$/g (average grain diameter: about 30 nm), and LaCl$_3$ as a donor compound were prepared. Then, SrO$_3$ and TiO$_2$ were weighed in such a way that the compounding molar ratio m of a Sr site to a Ti site (=Sr site/Ti site) was 1.000, and LaCl$_3$ was weighed in such a way that the content of La was 0.8 mol with respect to 100 mol of the Ti element.

Then, 3 parts by weight of ammonium polycarboxylate were added as a dispersant to 100 parts by weight of these weighed materials, and then the resulting mixture was charged into a ball mill with PSZ balls of 2 mm in diameter as a pulverizing medium and pure water, and wet-mixed for 16 hours in the ball mill to prepare a slurry.

Next, this slurry was evaporated to dryness, and then subjected to a calcination treatment at a calcining temperature of 1400° C. for 2 hours in an atmosphere of the air to obtain a calcined powder with La solid-solved in crystal grains.

Next, MnCO3 was weighed in such a way that the content of a Mn element as an acceptor element was 0.3 mol with respect to 100 mol of the Ti element, SiO$_2$ was weighed in such a way that the molar content of Si was 0.1 mol with respect to 100 mol of the Ti element, these weighed materials were added to the calcined powder, and further ammonium polycarboxylate as a dispersant was added to the calcined powder so as to be 0 to 3 parts by weight with respect to 100 parts by weight of the calcined powder. Then, the resulting mixture was charged into a ball mill again with PSZ balls of 2 mm in diameter and pure water, and wet-mixed for 48 to 64 hours in the ball mill to disperse crystal grains to obtain a mixture. In addition, in the present example, MnO3 was added to the calcined powder; however, a MnCl2 solution or a Mn sol solution may be added.

The resulting mixture was evaporated to dryness and heat-treated at 600° C. for 5 hours in an atmosphere of the air to remove an organic component such as the dispersant and obtain a heat-treated powder.

Next, an organic solvent such as toluene or alcohol, and an appropriate amount of dispersant were added to the heat-treated powder, and the resulting mixture was charged into a ball mill again with PSZ balls of 2 mm in diameter, and wet-mixed for 16 hours in the ball mill. Thereafter, polyvinyl butyral (PVB) as an organic binder, dioctyl phthalate (DOP) as a plasticizer, and further a cationic surfactant were added in appropriate amounts, and wet-mixed for 1.5 hours to prepare a ceramic slurry.

Thereafter, the ceramic slurry was either passed through a filter with a bore of 10 μm one or two times or filtering was skipped (depending on the sample prepared—see the discussion in the analysis of the samples below).

Next, using a lip coater method, the ceramic slurry subjected to the filter treatment was subjected to forming process to prepare a ceramic green sheet. Then, a conductive paste for internal electrodes predominantly composed of Ni was applied onto the ceramic green sheet by screen printing, whereby a conductive film with a predetermined pattern was formed on the surfaces of the ceramic green sheet.

Then, 10 ceramic green sheets having the conductive films formed thereon were laminated in a predetermined direction, and then a ceramic green sheet for exterior sections not having conductive films formed thereon was placed on each of a top and a bottom surfaces, and the laminated ceramic green sheets were subjected to thermocompression bonding so as to have a thickness of about 0.7 mm in the subsequent process to obtain a block body in which the ceramic green sheets and internal electrodes were alternately laminated on each other.

Thereafter, the block was cut into a piece with a predetermined dimension to form a laminate, and the laminate was subjected to a debinder treatment at a temperature of 400° C. for 2 hours in a nitrogen atmosphere. Then, the laminate was subjected to primary firing at a firing temperature of 1200 to 1250° C. for 2 hours in a reducing atmosphere composed of H2 flow and N2 flow adjusted in proportions of 1:100 to be brought into a semiconductor state.

Next, a secondary firing was carried out at a temperature of 700° C. for 1 hour in an atmosphere of the air to reoxidize the semiconductor ceramic, whereby, oxygen was dispersed in the grain boundary to form a grain boundary insulating layer, and then an end face was polished to prepare a component body.

Then, sputtering was applied to opposite ends of the component body to form underlying external electrodes having three-layer structure including a Ni—Cr layer, a Ni—Cu layer, and an Ag layer. Then, electrolytic plating was applied to form a Ni film and a Sn film sequentially on the surfaces of the underlying electrodes, thereby obtaining sample numbers 1 to 8.

Figure 2:
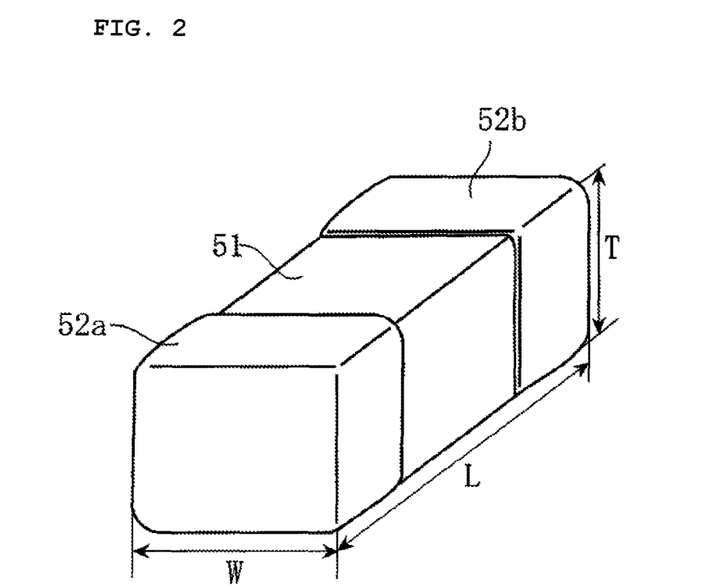
FIG. 2 is a perspective view schematically showing a laminated semiconductor ceramic capacitor prepared in a present example.

FIG. 2 is a perspective view of a sample, and external electrodes 52a and 52b are formed at opposite ends of the component body 51. The outer dimension of each of the samples was 1.0 mm in length L, 0.5 mm in width W, and 0.5 mm in thickness T.

[Evaluations of Samples]

Figure 3:
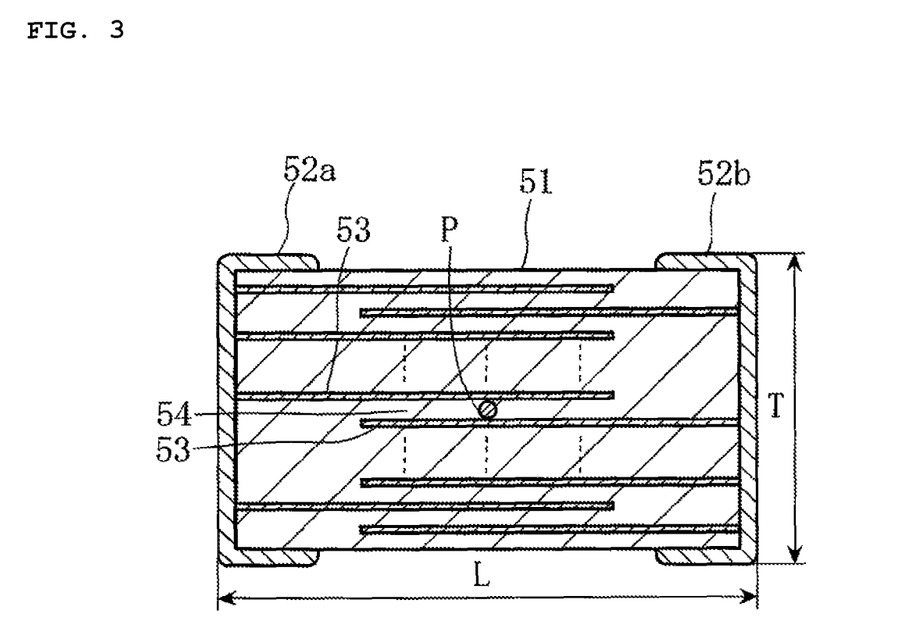
FIG. 3 is a longitudinal sectional view of FIG. 2.

Three samples of each of the sample numbers 1 to 8 were prepared, each sample was held in such a position that a width direction W was directed along a vertical direction, the sample was encased in resin, and a LT face defined by the length L and the thickness T of the sample (see FIG. 2) was exposed to the resin. Thereafter, the LT face of each sample was polished by a polishing machine to a depth of about a half of the width W, and further the polished face was chemically etched to obtain a sample cross-section for crystal grain observation as shown in FIG. 3.

Next, a photograph of a substantially central area of a semiconductor ceramic layer 54 sandwiched between the internal electrodes 53 (indicated by P in FIG. 3) was taken with an scanning electron microscope (SEM) to obtain a SEM image. Then, the crystal grain diameter was determined on a circle equivalent basis from the SEM image according to JIS R 1670. Then, an average of three samples of every sample numbers was calculated to be taken as an average grain diameter $D_{ave}$, and a coefficient of variation CV was determined based on the average grain diameter $D_{ave}$ and a standard deviation $\sigma$ of the samples.

Further, the capacitance of each of the sample numbers 1 to 8 was respectively measured under the conditions of a frequency of 1 kHz and a voltage of 1 V by using an impedance analyzer (manufactured by Agilent Technologies, Inc.: HP4194A), and further a direct voltage of 50 V was applied for 1 minute, and an initial insulation resistance IR0 was measured from its leakage current.

Further, to each sample of the sample numbers 1 to 8, the contact discharge at 30 kV of the sample positively and negatively charged was repeatedly applied 10 times, 100 times, 200 times and 1000 times according to IEC61000-4-2 (International Standard) which is an immunity test standard of ESD. Then, a DC voltage of 50 V was applied to each sample of the sample numbers 1 to 8 for 1 minute after the contact discharge, and insulation resistance IR after the contact discharge was measured from its leakage current.

Table 1 shows the production conditions of the ceramic slurry, the average grain diameter $D_{ave}$ of crystal grains after contact discharge, the coefficient of variation CV, the capacitance, the initial insulation resistance IR0, and the insulation resistance IR after contact discharge of the sample numbers 1 to 8. In addition, the insulation resistance IR is shown as a common logarithm (log IR).

TABLE 1

| | Production Conditions | | | Crystal Grain | | | Initial | Insulation Resistance after Contact Discharge Log IR (IR: Ω) | | | |
|---|---|---|---|---|---|---|---|---|---|---|---|
| Sample No. | Additive Amount of Dispersant (part(s) by weight) | Mixing Time (hr) | Number of Filtering Treatments (time) | Average Grain Diameter $D_{ave}$ (∝m) | Coefficient of Variation CV (%) | Capacitance (nF) | Insulation Resistance Log IR₀ (IR: Ω) | after 10 times | after 100 times | after 200 times | after 1000 times |
| 1* | 0 | 64 | 0 | 1.8 | 70 | 1.53 | 8.3 | 8.1 | 6.2 | — | — |
| 2* | 0 | 64 | 1 | 1.2 | 60 | 1.31 | 8.5 | 8.5 | 8.3 | 6.5 | — |
| 3* | 0 | 64 | 2 | 0.93 | 55 | 1.29 | 8.5 | 8.5 | 8.4 | 8.2 | 6.3 |
| 4* | 1 | 48 | 0 | 0.87 | 48 | 1.27 | 8.6 | 8.6 | 8.5 | 8.3 | 6.8 |
| 5 | 1 | 48 | 1 | 0.85 | 30 | 1.25 | 8.7 | 8.7 | 8.6 | 8.6 | 8.0 |
| 6 | 1 | 48 | 2 | 0.83 | 18 | 1.23 | 8.5 | 8.5 | 8.5 | 8.5 | 8.5 |
| 7* | 3 | 48 | 0 | 0.77 | 36 | 1.24 | 8.8 | 8.8 | 8.5 | 8.0 | 6.5 |
| 8 | 3 | 48 | 1 | 0.73 | 15 | 1.26 | 8.9 | 8.9 | 8.9 | 8.9 | 8.9 |

*outside the scope of the present invention

In the sample No. 1, since the dispersant was not added in preparing the mixture prior to preparation of the heat-treated powder and filtering was also omitted, the crystal grains were as coarse as the average grain diameter $D_{ave}$ of 1.8 µm, and the variations in a grain diameter were as large as the coefficient of variation CV of 70%. Therefore, although the initial insulation resistance log IR0 was 8.3 and the insulation resistance log IR was 8.1 at the time when contact discharge of the sample positively and negatively charged was repeated 10 times, the insulation resistance log IR was reduced to 6.2 to impair the insulating properties and deteriorate the durability when contact discharge of the sample positively and negatively charged was repeated 100 times.

In the sample No. 2, it was found that when contact discharge of the sample positively and negatively charged was repeated 200 times, the insulation resistance log IR was reduced to 6.5, and durability for ESD was low. The reason for this is probably that the average grain diameter $D_{ave}$ of the crystal grains could be made as small as 1.2 µm because filtering was performed once, but the average grain diameter $D_{ave}$ exceeded 1.0 µm and furthermore the coefficient of variation CV was 60% and the variations in a grain diameter were large, and the coarse grains were localized because the dispersant was not added as with the sample No. 1.

In the sample No. 3, it was found that when contact discharge of the sample positively and negatively charged was repeated 1000 times, the insulation resistance log IR was 6.3, resulting in a reduction of insulating properties, and adequate durability for ESD occurring repeatedly was not yet achieved. The reason for this is probably that the average grain diameter $D_{ave}$ of the crystal grains was 0.93 µm and could be kept below 1.0 µm because filtering was performed twice, but the coefficient of variation CV was 55% and the variations in a grain diameter were large, and the coarse grains were localized because the dispersant was not added as with the sample Nos. 1 and 2.

In the sample No. 4, it was found that since filtering was not performed although the dispersant was added in an amount of 1 part by weight with respect to 100 parts by weight of the calcined powder, when contact discharge of the sample positively and negatively charged was repeated 1000 times, the insulation resistance log IR was 6.8, resulting in a reduction of insulating properties, and adequate durability for ESD occurring repeatedly was not achieved. The reason for this is probably that the dispersant was added in preparing the mixture, but in subsequently preparing the ceramic slurry, the crystal grains agglomerated, and the variations in a grain diameter increased resulting from such agglomerated crystal grains and the coefficient of variation CV was as large as 48%.

Further, in the sample No. 7, it was found that since filtering was not performed although the dispersant was added in an amount of 3 parts by weight with respect to 100 parts by weight of the calcined powder, for the reason similar to the sample No. 4, when contact discharge of the sample positively and negatively charged was repeated 1000 times, the insulation resistance log IR was 6.5, resulting in a reduction of insulating properties, and adequate durability for ESD occurring repeatedly was not yet achieved.

On the other hand, in each of the sample Nos. 5, 6 and 8, since the dispersant was added in preparing the mixture prior to preparation of the heat-treated powder and filtering was performed at least once, the average grain diameter $D_{ave}$ of the crystal grains was 0.73 to 0.85 µm, the coefficient of variation CV was 15 to 30%, and both were within the range of the present invention. Therefore, it was found that even when contact discharge of the sample positively and negatively charged was repeated 1000 times, the insulation resistance log IR was 8.0 to 8.9, it was possible to ensure good insulation properties of 8 or more and achieve good durability for ESD occurring repeatedly.

Particularly, as is evident from the results of the sample Nos. 5, 6 and 8, it was found that when the number of the filter treatments or/and the amount of the dispersant are increased, the insulation resistance log IR nearly equal to the initial insulation resistance log IR0 can be ensured even when contact discharge of the sample positively and negatively charged was repeated 1000 times.

The invention claimed is:

1. A laminated semiconductor ceramic capacitor, comprising:
    a sintered ceramic body having a plurality of alternately stacked semiconductor ceramic layers and internal electrode layers, the semiconductor ceramic layers comprising SrTiO3, each semiconductor ceramic layer having crystal grains with an average grain diameter Dave equal to or less than 1.0 µm and a coefficient of variation CV of the grain diameter of the crystal grains of the semiconductor ceramic layer which is 30% or less, wherein CV is a ratio of a standard deviation σ to the average grain diameter Dave expressed as a percentage; and
    external electrodes on opposite surfaces of the sintered ceramic body and electrically connect to the internal electrodes;
    wherein:
        the semiconductor ceramic layers further comprise a donor element and an acceptor element
        a compounding molar ratio m of a Sr site to a Ti site satisfies the relational expression 0.990≤m≤1.010;
        the donor element is solid-solved in the crystal grains; and
        an acceptor element is present in a grain boundary layer no greater than 0.7 mol with respect to 100 mol of the Ti element.

2. The laminated semiconductor ceramic capacitor according to claim 1, wherein the acceptor element is at least one element of Mn, Co, Ni, and Cr.

3. The laminated semiconductor ceramic capacitor according to claim 1, wherein the donor element is at least one element selected from La, Nd, Sm, Dy, Nb, and Ta.

4. The laminated semiconductor ceramic capacitor according to claim 1, wherein the sintered ceramic body includes a low melting point oxide in an amount of 0.1 mol or less with respect to 100 mol of the Ti element.

5. The laminated semiconductor ceramic capacitor according to claim 4, wherein the low melting point oxide is SiO2.

6. The laminated semiconductor ceramic capacitor according to claim 1, wherein the internal electrode is predominantly composed of Ni.

7. A method for manufacturing a laminated semiconductor ceramic capacitor, the method comprising:
    mixing a calcinated powder containing an Sr compound, a Ti compound and a donor compound with at least an acceptor compound and a dispersant and heat-treating the resulting mixture to prepare a heat-treated powder;
    forming the heat-treated powder into slurry to prepare a ceramic slurry;
    subjecting the ceramic slurry to a filter treatment;
    forming a ceramic green sheet using the filtered ceramic slurry and then alternately laminating layers of conductive film and the ceramic green sheet to form a laminate;

subjecting the laminate to a firing treatment comprising a primary firing treatment in a reducing atmosphere followed by a secondary firing treatment in an atmosphere of air or an oxidizing atmosphere;

wherein the foregoing acts are carried out in such a manner that an average grain diameter Dave of the semiconductor ceramic is 1.0 μm or less after the firing treatment and such that a coefficient of variation CV of crystal grains of the semiconductor ceramic is 30% or less, the CV ratio being a ratio of a standard deviation σ to the average grain diameter Dave of the semiconductor ceramic expressed as a percentage.

8. The method according to claim 7, wherein the filtering step is performed by passing the ceramic slurry through a filter with a bore of 30 μm or less on a circle equivalent basis.

9. The method according to claim 8, wherein the filter has a bore of 5 μm or more on the circle equivalent basis.

10. The method according to claim 7, wherein the filtering is performed multiple times.

11. The method according to claim 7, wherein the content of the dispersant is 1 to 3 parts by weight with respect to 100 parts by weight of the calcined powder.

12. The method according to claim 7, wherein a firing temperature used in the primary firing treatment is lower than a calcining temperature used in the second firing treatment.

13. The method according to claim 7, further comprising forming the calcined powder by mixing and pulverizing the Sr compound, the Ti compound and the donor compound into a powder and then calcining the powder.

14. A laminated semiconductor ceramic capacitor, comprising:

a sintered ceramic body having a plurality of alternately stacked semiconductor ceramic layers and internal electrode layers, the semiconductor ceramic layers comprising $SrTiO_3$, each semiconductor ceramic layer having crystal grains with an average grain diameter Dave equal to or less than 1.0 μm and a coefficient of variation CV of the grain diameter of the crystal grains of the semiconductor ceramic layer which is 30% or less, wherein CV is a ratio of a standard deviation σ to the average grain diameter Dave expressed as a percentage, the sintered ceramic body including a low melting point oxide in an amount of 0.1 mol or less with respect to 100 mol of the Ti element; and external electrodes on opposite surfaces of the sintered ceramic body and electrically connect to the internal electrodes.

15. The laminated semiconductor ceramic capacitor according to claim 14, wherein the low melting point oxide is $SiO_2$.

* * * * *